United States Patent
Nystrom et al.

(10) Patent No.: US 11,055,976 B2
(45) Date of Patent: Jul. 6, 2021

(54) USING A SKIP BLOCK MASK TO REDUCE BITRATE FROM A MONITORING CAMERA

(71) Applicant: Axis AB, Lund (SE)

(72) Inventors: Johan Nystrom, Lund (SE); Xing Danielsson Fan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/947,659

(22) Filed: Aug. 11, 2020

(65) Prior Publication Data

US 2021/0090413 A1 Mar. 25, 2021

(30) Foreign Application Priority Data

Sep. 19, 2019 (EP) .................................... 19198391

(51) Int. Cl.
| | |
|---|---|
| *G08B 13/196* | (2006.01) |
| *H04N 19/166* | (2014.01) |
| *H04N 19/167* | (2014.01) |
| *H04N 19/176* | (2014.01) |
| *G06T 7/11* | (2017.01) |

(52) U.S. Cl.
CPC .......... *G08B 13/19667* (2013.01); *G06T 7/11* (2017.01); *H04N 19/166* (2014.11); *H04N 19/167* (2014.11); *H04N 19/176* (2014.11)

(58) Field of Classification Search
CPC .......... G08B 13/19667; H04N 19/166; H04N 19/167; H04N 19/176; H04N 7/183; H04N 19/132; H04N 19/174; H04N 19/162; H04N 19/109; H04N 21/2343; H04N 21/4402; G06T 7/11
See application file for complete search history.

(56) References Cited

U.S. PATENT DOCUMENTS

| | | | |
|---|---|---|---|
| 9,131,173 | B2 | 9/2015 | Kim |
| 9,756,348 | B2 | 9/2017 | Lundberg |
| 10,123,020 | B2 | 11/2018 | Ardo et al. |

(Continued)

FOREIGN PATENT DOCUMENTS

| | | |
|---|---|---|
| EP | 1315380 A2 | 5/2003 |
| EP | 3343917 A1 | 7/2018 |

OTHER PUBLICATIONS

European Search Report; European Patent Office. Application No. 19198391.5; Place of Search: Munich; Date of Completion of the Search: Dec. 11, 2019. pp. 1-8.

*Primary Examiner* — Nam D Pham
(74) *Attorney, Agent, or Firm* — Mollborn Patents, Inc.; Fredrik Mollborn (57) ABSTRACT

Methods and apparatus, including computer program products, implementing and using techniques for reducing bitrate from a monitoring camera. A first input is received that identifies first regions of an image representing a camera field of view. The first regions contribute significantly to the bitrate. A second input is received that identifies second regions of the image. The second regions contain information that is deemed to be of little visual interest to a user of the monitoring camera. Third regions of the image are determined. The third regions are regions where the first and second regions overlap at least in part. Video encoder settings are applied to force skip blocks in at least some of the third regions, thereby reducing contributions to the bitrate from the third regions.

13 Claims, 4 Drawing Sheets

(56) References Cited

U.S. PATENT DOCUMENTS

| | | | |
|---|---|---|---|
| 10,136,132 B2 | 11/2018 | Zhou et al. | |
| 2019/0104317 A1* | 4/2019 | Edpalm | H04N 19/114 |
| 2019/0373293 A1* | 12/2019 | Bortman | H04N 19/172 |

* cited by examiner

USING A SKIP BLOCK MASK TO REDUCE BITRATE FROM A MONITORING CAMERA

TECHNICAL FIELD

The present invention relates to video encoding, and more specifically, to reducing the bitrate for certain regions of an image in a video stream captured by a monitoring camera.

BACKGROUND

Monitoring cameras are used in many different applications, both indoors and outdoors, for monitoring a variety of environments. Images depicting a captured scene may be monitored by, e.g., an operator or a security guard. In many situations, certain parts of a captured image are of more interest than others to an operator. For example, an operator of the monitoring camera may be very interested in activities that occur outside a building entrance but may be less interested in seeing other moving or changing, yet unimportant, features in an image, such as blinking neon signs above the entrance to the building or trees that move in the wind, for example. In another exemplary situation, when a camera is used to record a sports event, such as a soccer game, the operator of the camera may be very interested in seeing details of the activities on the soccer field, but less interested in seeing what happens in the audience. On the other hand, for a surveillance operator, the field may in some scenarios be of less interest than the audience.

However, often these less interesting regions of the image contribute significantly to the bitrate produced by the monitoring camera, due to the fact that they often contain a large amount of movement or change over time, in the form of moving objects or flickering lights. Such dynamic image regions are generally more costly to encode than static image regions. This, in turn, may lead to both higher bandwidth and storage usage than what would be necessary if only the most "interesting" information in an image or video stream was kept. Therefore, it would be interesting to find solutions to video encoding that further reduces the bitrate produced by a monitoring camera.

U.S. Pat. No. 10,123,020, which is assigned to the assignee of the present application, describes block level update rate control based on gaze sensing. In accordance with the invention, a video encoder reduces the update rate of blocks in an image by forcing a video encoder to send skip blocks in frames of video when encoding interframes. When a skip block is indicated for a portion of video, no image data is sent for that portion of video. Typically, this applies to regions of an image that are not in the focus of the operator of the monitoring camera.

U.S. Pat. No. 9,756,348, which is also assigned to the assignee of the present application, describes a method, device and system for producing a merged digital video sequence. Two digital video sequences of different pixel densities (and therefore different bitrates) are produced. Pixel blocks that are considered to be of relevance (e.g., pixel blocks that contain motion or specific types of object) are identified. Pixel blocks that are not considered to be of relevance (e.g., pixel blocks not containing motion or pixel blocks that belong to the background of an image) are encoded using skip blocks, thereby resulting in a reduction of bitrate for the camera.

U.S. Pat. No. 9,131,173 describes a digital image photographing apparatus for skip mode reading and method of controlling the same. An imaging surface of an imaging device is divided into a plurality of regions. A first skip mode is applied to a region that is expected to include a target object. A different second skip mode to a region that is not expected to include the target object, so that images having different resolutions may be obtained from the plurality of regions (e.g., by regions of an image that do not include a target object having lower resolution compared to the regions of the image that include the target object).

U.S. Pat. No. 10,136,132 describes adaptive skip or zero block detection combined with transform size decision. A video encoder determines whether, and at what stage of the encoding process, a block of a picture can be encoded as a skip block and/or zero block using skip mode encoding to reduce the computational effort and increase the speed with which encoding is performed, for example, based on evaluation of luminance values of the blocks.

SUMMARY

It is an object of the present invention to provide techniques for reducing bitrate from a monitoring camera, to enable efficient use of available bandwidth and storage. This and other objects are achieved by a method according to claim 1, a system according to claim 11, a computer program product according to claim 12, and a storage medium according to claim 13.

According to a first aspect, these and other objects are achieved, in full or at least in part, by a method, in a computer system, for reducing bitrate from a monitoring camera. The method includes:

receiving a first input identifying first regions of an image representing a camera field of view, the first regions contributing significantly to the bitrate;

receiving a second input identifying second regions of the image, the second regions containing information deemed to be of little visual interest to a user of the monitoring camera;

determining third regions of the image, the third regions being regions where the first and second regions overlap at least in part; and applying video encoder settings to force skip blocks in at least some of the third regions, thereby reducing contributions to the bitrate from the third regions.

This provides a way of encoding regions that are of little or no interest to the operator of a camera operator in a way that uses very little data, and that results in a significant reduction in both bitrate and storage space compared to if the entire image was coded using conventional techniques.

According to one embodiment the first, second and third regions are represented as blocks of pixels in an image captured by the camera. Having regions that coincide with pixel blocks is a common way of doing video encoding, in which an image is divided into sub-areas and where redundancies between the sub-areas are analyzed. Using similar techniques in this invention therefore facilitates integration with conventional video monitoring systems.

According to one embodiment, the second input is a user input. That is, the users can make a determination about what regions they consider to be "important" or "of interest" and provide such information to the encoder. This allows the users to have complete control over decisions as to what regions are interesting or not, rather than having to rely on "guesswork" by the encoder itself.

According to one embodiment, the second input is generated by the user through a graphical user interface or an application programming interface. This provides a convenient and intuitive way for users to provide input to the encoder as to which regions of the image the user considers to be of interest.

According to one embodiment, the second input is automatically generated, based on an image segmentation. This leads to a wide array of advantages for various use cases. For example, for a large site installation and configuration with hundreds of cameras, instead of letting the user specify that area for each camera one by one, deep learning can be used to more produce a segmentation map more efficiently.

According to one embodiment, the first input is generated by the video encoder, based on a threshold value representing a cost for encoding the first regions. That is, a threshold can be set, by a user or by the encoder itself, and the threshold can be used as a cutoff value for determining which regions have a high bitrate contribution, either in relative terms compared to other regions of the image, or in absolute terms.

According to one embodiment, the first input is generated by an image analysis algorithm, based on a complexity of the image. That is, the captured image can be analyzed by an image analysis algorithm, which determines what parts of the image are complex (and thus requires a higher bitrate encoding) and the identifies such image areas as first regions.

According to one embodiment, prior to applying the video encoder settings, a suggestion of the third regions can be provided to a user of the monitoring camera, to allow the user to confirm or reject individual regions among the third regions. That is, the skip region calculation unit can try to make a "best guess" as to what would be suitable third regions (i.e., regions to be encoded as skip blocks) and provide a suggestion to the user of such regions. The user can then accept or decline the suggestions from the skip region calculation unit. This may lead to a quicker determination of third regions (compared to when a user inputs all second regions), and then have the encoder determine the third regions based on such input.

According to one embodiment, the suggestion of the third regions is provided on a user interface as an overlay on the image. That is, the suggestion can be presented to a user as an overlay, which makes it easy for the user to see whether the suggested regions correspond to the image regions that the user had in mind. It also makes it easy for a user to accept or decline all or individual proposals by the encoder.

According to one embodiment, the method further includes calculating an estimated bitrate from the monitoring camera, modifying at least some of the first and second regions to determine modified third regions, and calculating a modified estimated bitrate from the monitoring camera using the modified third regions. This allows the user to compare different "scenarios," i.e., what would happen to the bitrate if a different set of regions were selected as being of little interest, or if different criteria were set for what should be considered a high contribution to the bitrate, etc.

According to one embodiment, the method further includes using the results of the calculations to modify one or more of the first and second inputs, and applying video encoder settings in accordance with the modified first and second inputs. This allows the user to change an original set of third regions into a different set of third regions. Having the ability to "experiment" in such a way and make various modifications can allow the user to achieve an optimal reduction in bitrate and storage space required for a particular surveillance situation at hand.

According to a second aspect, the invention relates to a system for reducing bitrate from a monitoring camera. The system includes a skip region calculation unit and an encoder. The skip region calculation unit is configured to: receive a first input identifying first regions of an image representing a camera field of view, the first regions contributing significantly to the bitrate; receive a second input identifying second regions of the image, the second regions containing information deemed to be of little visual interest to a user of the monitoring camera; determine third regions of the image, the third regions being regions where the first and second regions overlap at least in part. The encoder is configured to force skip blocks in at least some of the third regions, thereby reducing contributions to the bitrate from the third regions. The system advantages correspond to those of the method and may be varied similarly.

According to a third aspect, the invention relates to a computer program for reducing bitrate from a monitoring camera. The computer program contains instructions corresponding to the steps of:

receiving a first input identifying first regions of an image representing a camera field of view, the first regions contributing significantly to the bitrate;

receiving a second input identifying second regions of the image, the second regions containing information deemed to be of little visual interest to a user of the monitoring camera;

determining third regions of the image, the third regions being regions where the first and second regions overlap at least in part; and applying video encoder settings to force skip blocks in at least some of the third regions, thereby reducing contributions to the bitrate from the third regions.

According to a fourth aspect, the invention relates to a digital storage medium comprising such a computer program. The computer program and the storage medium involve advantages corresponding to those of the method and may be varied similarly.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

As was described above, one object with the various embodiments of the current invention is to reduce the bitrate from a monitoring camera. A user of the monitoring camera can designate regions of an image that contain "unimportant" information, but still contribute significantly to the bitrate. Once these regions have been designated, a skip block mask can be applied to the regions, which forces the encoder to encode these regions as skip blocks. Since skip blocks contains very little data, typically only one bit, the bitrate can potentially be significantly reduced through the use of this technique.

Embodiments of the invention can include various tools for aiding the user in the selection of regions to which the skip block mask should be applied. For example, the user can be presented with an overlay on the image captured by the monitoring camera, which indicates the bitrate contribution from different regions of the image. These regions are in other part of this application denoted "first regions". The bitrate contribution may, e.g., be indicated by use of differently colored, typically transparent, overlays, such as light red for bitrate contribution that are higher, e.g., over a predetermined threshold and light green for bitrate contribution that are lower, e.g., below a certain threshold. The user can then select a number of those regions from this map onto which a skip block mask should be applied, for example, where there is a high bitrate contribution, but no interesting objects are expected to appear. The user may also start by indicating all regions in the depicted scene which are "unimportant", i.e., of little visual interest, e.g., by drawing polygons in a graphical user interface or inputting coordinates of such regions. The regions of little visual interest are in other part of this application denoted "second regions". After that, the user may select for skip block masking a number of regions in the image which both have high bitrate and are of little visual interest, based on the overlap between the two types of regions. The regions where the skip block mask is to be applied are in other parts of this application denoted "third regions". These regions are found in the overlap between the regions of high bitrate and little visual interest.

Some embodiments can include various types of machine learning or artificial intelligence tools, which can learn over time, or during a configuration stage, what types of objects and/or regions a user typically considers to be "unimportant". As mentioned above, such regions are in other parts of this application denoted "second regions".

The suggestions for "unimportant" regions may be presented to a user for confirmation prior to being used as input to the skip block masking decisions. As a convenient option, the user may be presented with overlays which indicate both the bitrate contribution information and the suggestion of "unimportant" regions. The information of which regions are suggested to be unimportant may be presented as patterned, e.g., dotted or striped. This can conveniently be combined with overlays indicating bitrate by adding color to the pattern, thereby making it possible for the user to quickly grasp the suggestion from the software. One example would be to add a striped pattern to suggested "unimportant" regions, and color such stripes red in areas which also have a high bitrate contribution. Such an overlay or marking of the image would typically appear in an image region depicting trees with swaying branches, and the user may then decide to a apply a skip block mask to that area by selecting the area in a user interface, such as by drawing a polygon on top of the region in a graphic user interface and indicating that the polygon should be set as a skip block mask The effect will then be that this image region will update at a much slower rate than the remaining image, such as once per GOP instead of in each frame, despite the tree moving its branches from frame to frame. Obviously, many different options exist and are available to a user interface designer for how to present the suggestions to the user.

In some embodiments, the user may be provided with a suggestion for various skip block masks and may be presented with "before" and "after" values showing how the bitrate from the camera would change when a particular skip block mask is applied to an image captured by the monitoring camera. The user can then configure the skip block mask to their liking, based on this information.

In order to better appreciate the details of the invention described herein, a brief overview of image encoding according to various embodiments will now be described. Images captured by a monitoring camera are normally transmitted to a site of use, such as a control center, where the images may be viewed and/or stored. Alternatively, they can be stored in so-called "edge storage", that is, storage at the camera, either on board the camera, such as on an SD-card, or in connection with the camera, such as on a NAS (network attached storage). Before transmission or edge storage, the images are typically encoded by an encoder to save bandwidth and storage space. Encoding may be performed in many different ways, for example, in accordance with the H.264 standard or other encoding standards.

In many digital video encoding systems, two main modes are used for compressing video frames of a sequence of video frames: intra mode and inter mode. In the intra mode, the luminance and chrominance channels (or in some cases RGB or Bayer data) are encoded by exploiting the spatial redundancy of the pixels in a given channel of a single frame via prediction, transform, and entropy coding. The encoded frames are called intra-frames (also referred to as "I-frames"). Within an I-frame, blocks of pixels, also referred to as macro blocks, coding units or coding tree units, are encoded in intra-mode, that is, they are encoded with reference to a similar block within the same image frame, or raw coded with no reference at all.

In contrast, the inter mode exploits the temporal redundancy between separate frames and relies on a motion-compensation prediction technique that predicts parts of a frame from one or more reference frames by encoding the motion in pixels from one frame to another for selected blocks of pixels. The encoded frames are referred to as inter-frames, P-frames (forward-predicted frames), which can refer to previous frames in decoding order, or B-frames (bi-directionally predicted frames), which can refer to two or more previously decoded frames, and can have any arbitrary display order relationship of the frames used for the prediction. Within an inter-frame, blocks of pixels may be encoded either in inter-mode, meaning that they are encoded with reference to a similar block in a previously decoded image, or in intra-mode, meaning that they are encoded with reference to a similar block within the same image frame, or raw-coded with no reference. A skip block is an inter-mode coded block of pixels, which refer to a corresponding block of pixels in a reference frame, from which corresponding block the image content should be completely copied.

The encoded image frames are arranged in groups of pictures (GOPs). Each GOP is started by an I-frame, which does not refer to any other frame, and is followed by a number of inter-frames (i.e., P-frames or B-frames), which do refer to other frames. Image frames do not necessarily have to be encoded and decoded in the same order as they are captured or displayed. The only inherent limitation is that a frame that serves as a reference frame must be decoded before other frames that use it as reference can be encoded.

As was mentioned above, in the image regions, i.e. the third image regions, where the skip block mask is created, the encoder in one embodiment forces skip blocks, for example, for every frame in a GOP except the I-frame, or for even longer periods. This may be suitable in cases where a scene does not change very often. In another embodiment, these third image regions can be analyzed on a per-frame basis, or at a rather high frame rate, so that there is a matching skip map for every non-I-frame. The skip period could be selected by the user and be different for different "skip block masks". It should be noted that by not masking the I-frames, a simple "time-lapse view" of the regions masked by the skip block mask can be created (i.e., only the I-frames will be visible when played back). This might be useful in certain scenarios, such as retail environments, for example.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The techniques in accordance with various embodiments of the invention will now be described by way of example and with reference to the figures.

Figure 1:
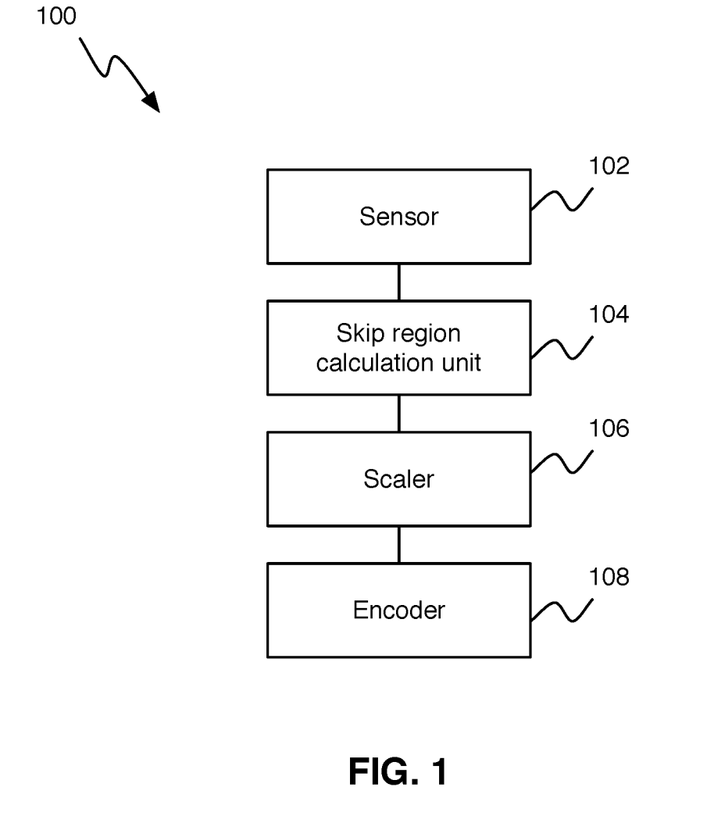
FIG. 1 shows a system for reducing bitrate from a monitoring camera, in accordance with one embodiment.

FIG. 1 is a schematic block diagram illustrating a system 100 in which the image encoding techniques in accordance with the various embodiments can be implemented. The system 100 can be implemented, for example, in a camera that captures images (e.g., a video sequence) of a scene. The system 100 comprises an image sensor 102, a skip region calculation unit 104, a scaler 106, and an encoder 108. Briefly, the image sensor 102 captures an image of a scene; the skip region calculation unit 104 determines the third regions, based on the first and second regions, the scaler 106 performs further operations such as downscaling or upscaling the image, rotating the image, adding various types of overlays, etc.; and the encoder 108 encodes the image, and forces the third regions to be encoded as skip blocks. These operations will be described in further detail below.

Figure 2:
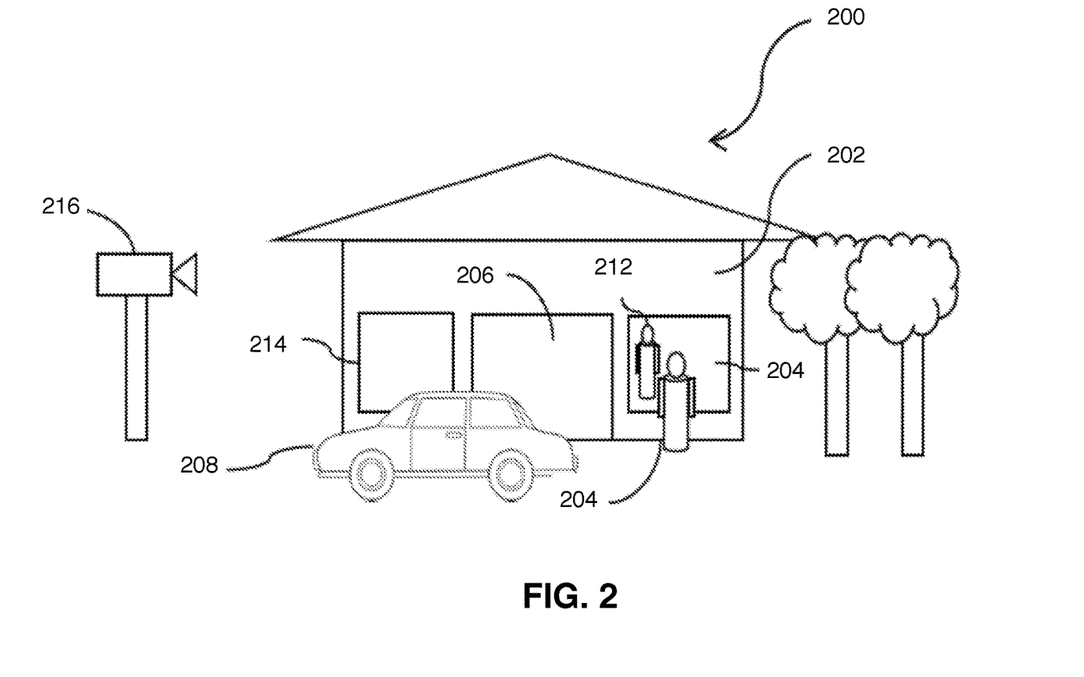
FIG. 2 shows an example of a scene monitored by a camera.

An example of a scene monitored by a camera is shown in FIG. 2. In the scene 200, there is a house 202 with windows 204, 214, and a doorway 206. A car 208 is parked in front of the house, and a first person 210 is standing outside the house. A second person 212 is in the house, visible through one of the windows 204, 214.

Figure 3:
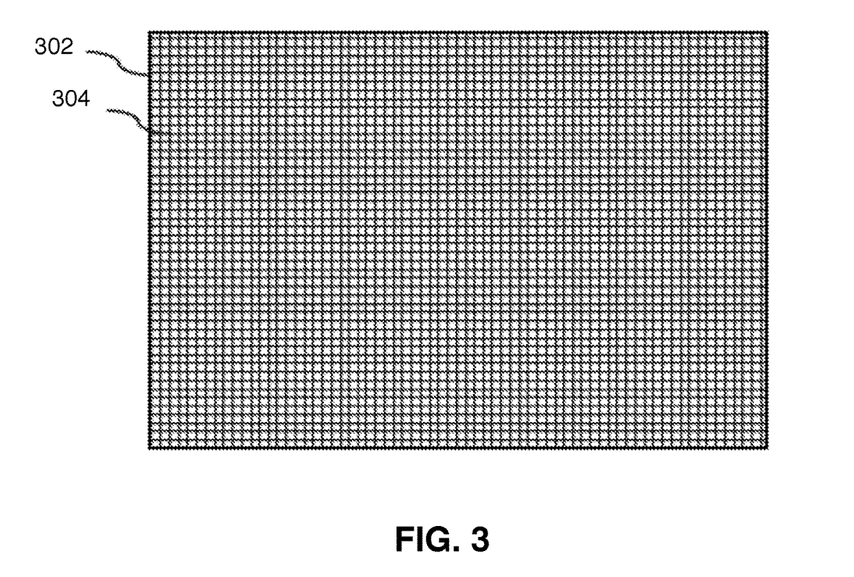
FIG. 3 shows an example of a principal structure of an image captured by the camera in FIG. 2.

A camera 216 captures images of the scene, using the sensor 102 of system 100 in the camera. FIG. 3 shows the principal structure of an image 302 captured by the sensor 102. The image 302 is made up of a number of pixels 304, corresponding to the pixels of the image sensor 102. The image may, for instance, be made up of 1280×720 pixels, 1920×1080 pixels, or 3840×2160 pixels.

Figure 4:
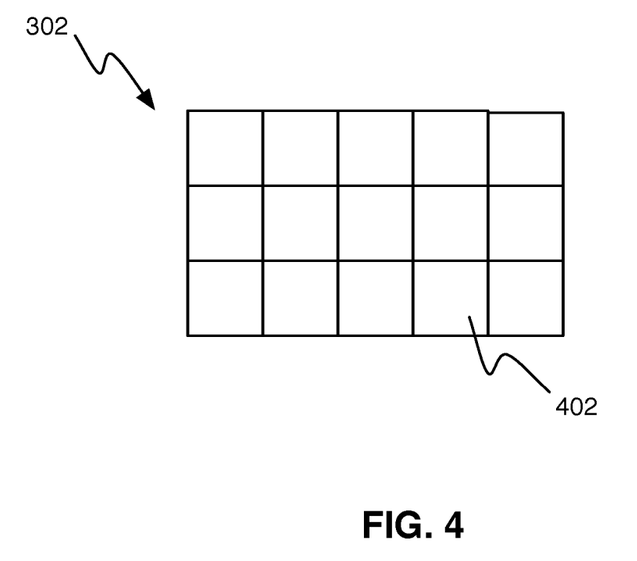
FIG. 4 shows an example of grouping pixels of the image in FIG. 3 into encoding units, in accordance with one embodiment.

The image captured by the sensor 102 is subjected to standard image processing, including e.g., noise reduction, local tone mapping, spatial and temporal filtering, etc. The image is then sent to the skip region calculation unit 104. For purposes of the various embodiments of the invention described herein, one important operation performed by the skip region calculation unit 104 includes grouping the pixels 304 of the image 302 into encoding units 402 of neighboring pixels 304, as shown in FIG. 4. The encoding units 402 are also referred to as blocks, macroblocks, pixel blocks, coding tree units, or coding units. An encoding unit 402 is typically square and made up of, e.g., 8×8, 16×16, or 32×32 pixels. However, it is also possible to group the pixels 304 into encoding units 402 of other sizes and shapes. It should be noted that the size of the encoding units 402 in FIG. 4 is exaggerated compared to the size of the pixels in FIG. 3, for purposes of illustration and explanation. In a real-life scenario, there would typically be a much larger number of encoding units 402 for the number of pixels 304 of FIG. 3. A bitrate contribution value is determined for each encoding unit 402. The bitrate contribution value for each encoding unit can be determined in a number of ways, for example, by using a cost function of the encoder. Based on the cost, the encoder can determine whether the encoding unit should be intra-coded, inter-coded, or coded as a skip block.

Figure 5:
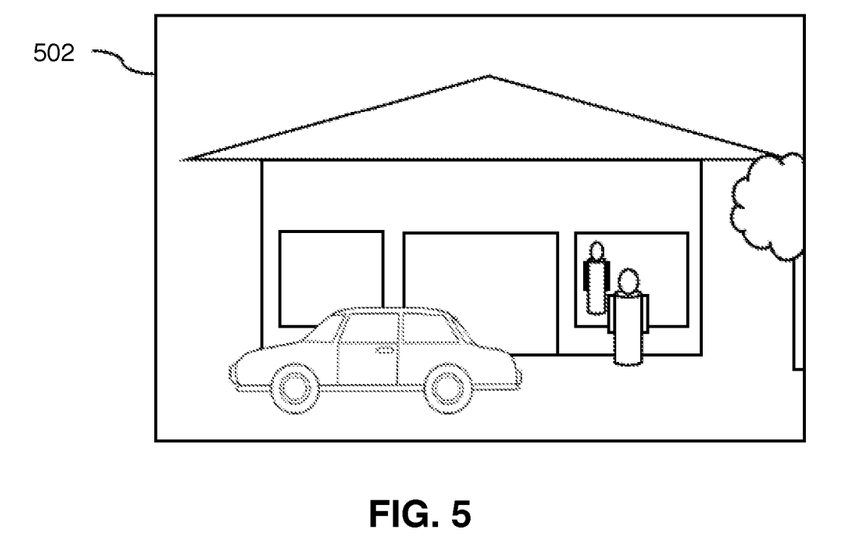
FIG. 5 shows an image captured by the camera in FIG. 2, with an overlaid bitrate contribution map, in accordance with one embodiment.

FIG. 5 shows an image 502 captured by the camera 216. As can be suspected from examining the image, the tree on the right side of the image may have a high contribution to the bitrate, as well does the sky above the tree, for example, due to passing clouds, etc., especially on a windy day. The user may decide that these parts of the image are not very important from a surveillance point of view, and therefore she may indicate that a skip block mask can be applied to these high bitrate regions. As mentioned above a skip block typically uses 1 bit of data, so significant savings in bitrate from the monitoring camera can be obtained.

Further, in some embodiments, machine learning systems, such as artificial neural networks, can be used to learn what features are typically not considered to be important by one or more users. For example, the system can learn that the typical user of a monitoring camera is not interested in recording images of trees. The system can then automatically identify trees, sky, etc. in the image, and propose a skip block mask to the encoder. Optionally, the system may also present alternative skip block mask alternatives to the user, and the user could make a decision about which skip block mask to use among the different alternatives, before the information is passed on to the encoder. Again, many variations of skip block mask selection are available to those having ordinary skill in the art.

Figure 6:
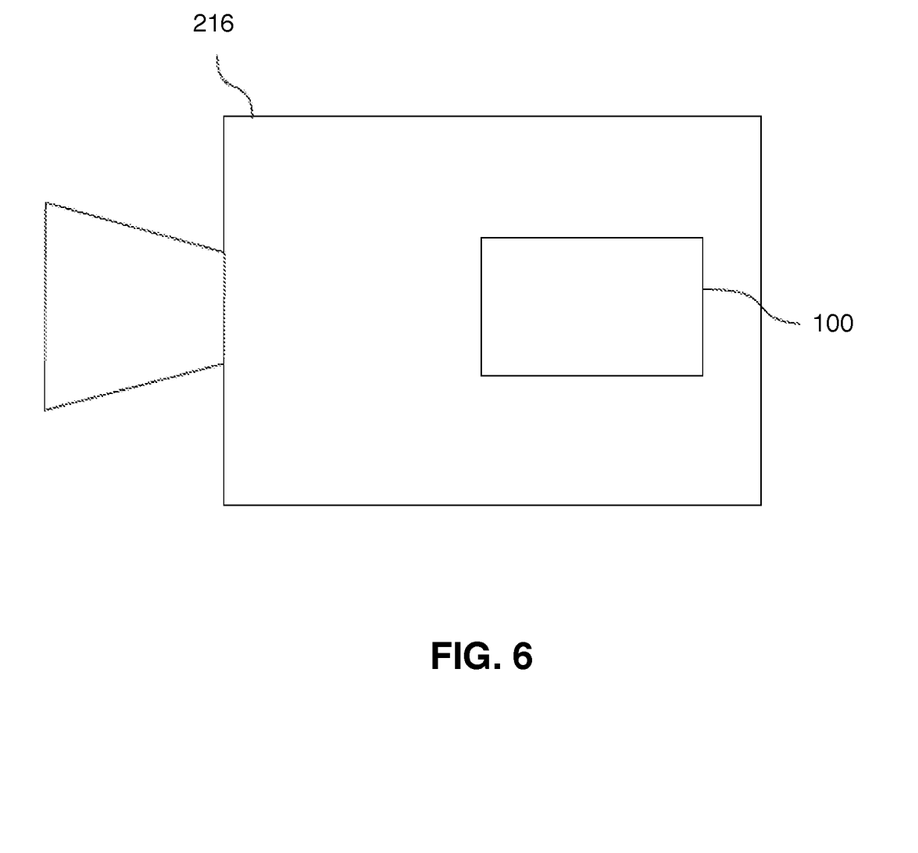
FIG. 6 shows a schematic example of a camera in which various embodiments of the invention can be implemented.

In FIG. 6, a camera 216 is shown, which includes a system 100, such as the one shown in FIG. 1. The camera 216 also has a number of other components, but as these are not part of the present invention, they are not shown and will not be further discussed here. The camera 216 may be any kind of camera, such as a visual light camera, an IR camera or a thermal camera.

As described in connection with FIG. 6, the encoding system 100 may be integrated in a camera 216. However, it is also possible to arrange some parts or the entire the encoding system separately 100, and to operatively connect it to a camera. It is also possible to transmit images from a camera to, e.g., a control center without any skip block masks, and to apply the skip block masks in the control center, e.g., in a VMS (Video Management System). In such a case, the encoding system may be arranged in the VMS or otherwise in the control center and used for so-called transcoding, where encoded images are received from the camera, decoded and then re-encoded, but now with the skip block mask.

The various embodiments of the invention described herein can be used with any encoding scheme using a GOP structure with an intra-frame and subsequent inter-frames, e.g., H.264, H.265 MPEG-4 Part 2, VP8, or VP9, all of which are familiar to those having ordinary skill in the art.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. For example, while the encoder typically determines whether the coding units should be intra-coded, inter-coded, or coded as a skip block, as described above, there may also be embodiments in which a user explicitly specifies the type of encoding. This can be done, for example, manually through a user interface, either at the beginning of the process, or by a user reviewing and confirming or overriding a suggestion provided by the encoder. Typically, the user only specifies what coding units should be coded as skip blocks and leaves the coding decision about intra- vs. inter-block coding to the encoder. Thus, many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for reducing bitrate from a monitoring camera, comprising:
   receiving a first input identifying first regions of an image captured by a camera and representing a camera field of view, the first regions having a bitrate contribution over a predetermined threshold;
   receiving a second input identifying second regions of the image, the second regions containing information deemed to be of little visual interest to a user of the monitoring camera;
   determining third regions of the image, the third regions being regions where the first and second regions overlap; and
   applying video encoder settings to encode at least some of the third regions as inter-mode coded blocks of pixels referring to a corresponding block of pixels in a reference frame, from which corresponding image content is completely copied, thereby reducing contributions to the bitrate from the third regions.

2. The method of claim 1, wherein the first, second and third regions are represented as blocks of pixels in an image captured by the camera.

3. The method of claim 1, wherein the second input is a user input.

4. The method of claim 3, wherein the second input is generated by the user through a graphical user interface or an application programming interface.

5. The method of claim 1, wherein the second input is automatically generated, based on an image segmentation.

6. The method of claim 1, wherein the first input is generated by the video encoder, based on a threshold value representing a cost for encoding the first regions.

7. The method of claim 1, wherein the first input is generated by an image analysis algorithm, based on a complexity of the image.

8. The method of claim 1, further comprising:
   prior to applying the video encoder settings, providing a suggestion of the third regions to a user of the monitoring camera, to allow the user to confirm or reject individual regions among the third regions.

9. The method of claim 8, wherein the suggestion of the third regions is provided on a user interface as an overlay on the image.

10. The method of claim 1, further comprising:
    calculating an estimated bitrate from the monitoring camera;
    modifying at least some of the first and second regions to determine modified third regions; and
    calculating a modified estimated bitrate from the monitoring camera using the modified third regions.

11. The method of claim 10, further comprising:
    using the results of the calculations to modify one or more of the first and second inputs; and
    applying video encoder settings in accordance with the modified first and second inputs.

12. A system for reducing bitrate from a monitoring camera, the system comprising:
    a skip region calculation unit, configured to:
    receive a first input identifying first regions of an image representing a camera field of view, the first regions having a bitrate contribution over a predetermined threshold,
    receive a second input identifying second regions of the image, the second regions containing information deemed to be of little visual interest to a user of the monitoring camera,
    determine third regions of the image, the third regions being regions where the first and second regions overlap,
    and
    an encoder configured to encode at least some of the third regions as inter-mode coded blocks of pixels referring to a corresponding block of pixels in a reference frame, from which corresponding image content is completely copied, thereby reducing contributions to the bitrate from the third regions.

13. A computer program product for reducing bitrate from a monitoring camera, comprising a non-transitory computer readable storage medium having program instructions embodied therewith, the program instructions being executable by a processor to perform a method comprising:
    receiving a first input identifying first regions of an image representing a camera field of view, the first regions having a bitrate contribution over a predetermined threshold;
    receiving a second input identifying second regions of the image, the second regions containing information deemed to be of little visual interest to a user of the monitoring camera;
    determining third regions of the image, the third regions being regions where the first and second regions overlap; and
    applying video encoder settings to encode at least some of the third regions as inter-mode coded blocks of pixels referring to a corresponding block of pixels in a reference frame, from which corresponding image content is completely copied, thereby reducing contributions to the bitrate from the third regions.

* * * * *